United States Patent
Yamada et al.

(10) Patent No.: US 6,878,925 B2
(45) Date of Patent: Apr. 12, 2005

(54) OPTICAL WIRING CIRCUIT, OPTICAL WIRING CIRCUITS LAYERED BODY AND OPTO-ELECTRIC WIRING APPARATUS

(75) Inventors: Hidenori Yamada, Ashigarakami-gun (JP); Masao Funada, Ashigarakami-gun (JP); Takeshi Kamimura, Ashigarakami-gun (JP); Junji Okada, Ashigarakami-gun (JP); Shinya Kyozuka, Ashigarakami-gun (JP); Kazuhiro Sakai, Ashigarakami-gun (JP); Tsutomu Hamada, Ashigarakami-gun (JP); Shinobu Ozeki, Ashigarakami-gun (JP); Osamu Takanashi, Ashigarakami-gun (JP); Masaaki Miura, Ashigarakami-gun (JP); Takehiro Niitsu, Ashigarakami-gun (JP); Tomo Baba, Ashigarakami-gun (JP); Masashi Hisada, Ashigarakami-gun (JP); Kenichi Kobayashi, Ashigarakami-gun (JP)

(73) Assignee: Fuji Xerox Co., Ltd., Tokyo (JP)

( * ) Notice: Subject to any disclaimer, the term of this patent is extended or adjusted under 35 U.S.C. 154(b) by 321 days.

(21) Appl. No.: 10/073,243

(22) Filed: Feb. 13, 2002

(65) Prior Publication Data

US 2002/0162951 A1 Nov. 7, 2002

(30) Foreign Application Priority Data

May 1, 2001 (JP) ........................................ 2001-134309

(51) Int. Cl.[7] ................................................ G01J 1/04
(52) U.S. Cl. ...................................... 250/227.11; 385/14
(58) Field of Search ................. 250/227.11; 385/88–94, 385/14, 84, 49

(56) References Cited

U.S. PATENT DOCUMENTS

| 4,720,634 A | | 1/1988 | D'Auria et al. ............. 250/551 |
| 4,850,044 A | | 7/1989 | Block et al. ................. 398/118 |
| 5,054,870 A | * | 10/1991 | Losch et al. ................... 385/14 |
| 5,757,989 A | * | 5/1998 | Yoshimura et al. ........... 385/14 |

FOREIGN PATENT DOCUMENTS

| JP | B2 6-22351 | 3/1994 |
| JP | B2 6-93051 | 11/1994 |
| JP | A 2000-329962 | 11/2000 |

* cited by examiner

Primary Examiner—Thanh X. Luu
(74) Attorney, Agent, or Firm—Oliff & Berridge, PLC

(57) ABSTRACT

A first optical wave guide 36 and a second optical wave guide 40 are connected to both sides of a planer optical waveguide 32, respectively. The other ends 36b, 40b of the first and second optical wave guides 36, 40 are extended over an upper surface 20 of an optical wiring circuit board 18. An electric wiring circuit 14 is connected to the other ends 36b, 40b of the first and second optical wave guides 36, 40, thereby constituting an optical wiring circuit 16. A plurality of optical wiring circuits 16 are superimposed on one another to thereby form an optical wiring circuits layered body 12. The electric wiring circuit 14 can be connected from one surface of the optical wiring circuit board 18, which makes it possible to facilitate the connection thereof.

11 Claims, 11 Drawing Sheets

OPTICAL WIRING CIRCUIT, OPTICAL WIRING CIRCUITS LAYERED BODY AND OPTO-ELECTRIC WIRING APPARATUS

BACKGROUND OF THE INVENTION

1. Field of the Invention

The present invention relates to an optical interconnection technique and, in particular, to the structure of an optical wiring circuit.

2. Description of the Related Art

To connect together a plurality of microprocessors and memories there has been generally used an electric bus circuit. However, in the case of the electric bus circuit, a signal delay caused by inter-connection-wiring capacity and connection wiring resistance limits the processing speed of a system using the electric bus circuit. When trying to make more dense a parallel-bus connection wiring, there arises a problem that an electromagnetic noise occurs; that is, it has been more and more difficult for the electric bus circuit to cope with the high-speed bus processing. In view of this, there has been proposed an optical interconnection technique in which the electric wiring is replaced with an optical wiring to enhance the speed of the bus.

For example, in JP-B-Hei. 6-22351, there is disclosed a technique in which two sets of light-emitting/light-receiving devices are disposed in both surfaces of each of circuit boards and the light-emitting/light-receiving devices on the mutually adjoining circuit boards incorporated into a system frame are connected together in terms of space by light. However, in the disclosed technique, since light/electricity conversion is necessary for every communication between the mutually adjoining circuit boards, the cost is expensive and the delay amount is large. Also, because the light is transmitted through a free space, the optical/electric element is difficult to position and is also weak against crosstalk and dust.

In JP-B-Hei. 6-93051, there is disclosed a technique in which there is provided a plate having two parallel surfaces and disposed opposed to a light source, a diffraction grating and a reflecting element are respectively disposed on the two surfaces of the plate, a free space defined by the diffraction grating and reflecting element is used to form an optical path, and circuits are optically connected together through the optical path. However, in this disclosed technique, because it aims at realizing one-to-one communication, the light emitted from one point is connected to the other only one fixed point; and thus, communication is possible neither between one point and other multiple points nor between multiple points and multiple points.

In JP-A-2000-329962, which was previously filed by the present applicants, there is disclosed a structure in which a planer optical waveguide is disposed on an optical circuit board and optical wave guides each formed of optical fibers are connected to both sides of the planer optical waveguide. However, in the disclosed structure, no attention is paid to arrangement and structure of the other end of the optical wave guide; that is, the other end of the optical wave guide is extended from the side surface of the optical circuit board and thus, to connect the optical circuit board with another optical circuit board or an electric wiring circuit, the optical wave guide must be bent in a complicated manner, which makes it difficult to position the other end of the optical wave guide.

In view of the related art circumstances, it is an object of the invention to provide a structure of an optical wiring circuit which not only is simple in structure but also is capable of facilitating the connection of the optical wiring circuit with another optical wiring circuit or an electric wiring circuit. Also, it is a second object of the invention to provide an optical wiring circuits layered body which is capable of light communication between multiple points and multiple points. Further, it is a third object of the invention to provide an optical/electric wiring apparatus which is reduced in the delay amount and is strong in coping with crosstalk and dust.

SUMMARY OF THE INVENTION

In order to solve the above problems, according to a first aspect of the invention, since other ends of the first and second optical wave guides are disposed on a side surface of a board, another optical wiring circuit and an electric wiring circuit can be connected to an optical wiring circuit from the side surface. Between an planer optical waveguide and a first or second optical wave guide, a light diffusing member may be interposed so that a light beam diffused by the planer optical waveguide can be transmitted. Also, especially, since the planer optical waveguide is disposed in parallel to a principal surface of the circuit board, a plurality of optical wiring circuits can be disposed in a sheet side surface direction.

According to a second aspect of the invention, there is provided an optical wiring circuits layered body comprising a plurality of optical wiring circuits having: an optical circuit board having a surface; an planer optical waveguide disposed on the optical circuit board and formed in a sheet-like shape; a first optical wave guide having a first one end optically connected to the planer optical waveguide; and a second optical wave guide having a second one end optically connected to the planer optical waveguide, wherein the first optical wave guide has a first other end connected to the first one end; the second optical wave guide has a second other end connected to the second one end; these first and second other ends face the surface of the optical circuit board; and these optical wiring circuits are superimposed on one another in the sheet side surface direction. Accordingly, since there is provided a structure in which the plurality of optical wiring circuits are superimposed on one another, the optical wiring circuit can be connected easily to another optical wiring circuit or an electric wiring circuit having a plurality of bits.

According to a third aspect of the invention, there is provided an opto-electric wiring apparatus comprising:

an optical wiring circuit having:
  at least one planer optical waveguide;
  at least one first optical wave guide having a first end optically connected to the planer optical waveguide; and
  at least one second optical wave guide having a second end optically connected to the planer optical waveguide;
an electric circuit board; and
an opto-electric conversion element disposed on the electric circuit board,
wherein the first optical wave guide has a first other end connected to the first end;
the second optical wave guide has a second other end connected to the second end;
the first and second other ends face a surface; and the opto-electric conversion element has an electric wiring circuit optically connected to one of the first other end of the first optical wave guide and the second other end of the second optical wave guide. Therefore, since the electric wiring circuit is connected to the optical wiring circuit on one surface thereof, the structure of the opto-electric wiring apparatus can be simplified, the delay amount thereof can be reduced, and the property of the opto-electric wiring apparatus to cope with the crosstalk and dust can be made strong. Further, by combining the opto-electric wiring apparatus with the above-mentioned optical wiring circuits layered body and electric wiring circuit, the opto-electric wiring apparatus is able to have more connection points.

DETAILED DESCRIPTION OF THE PREFERRED EMBODIMENTS

Next, description will be given below of the preferred embodiments according to the invention with reference to the accompanying drawings.

Figure 1:
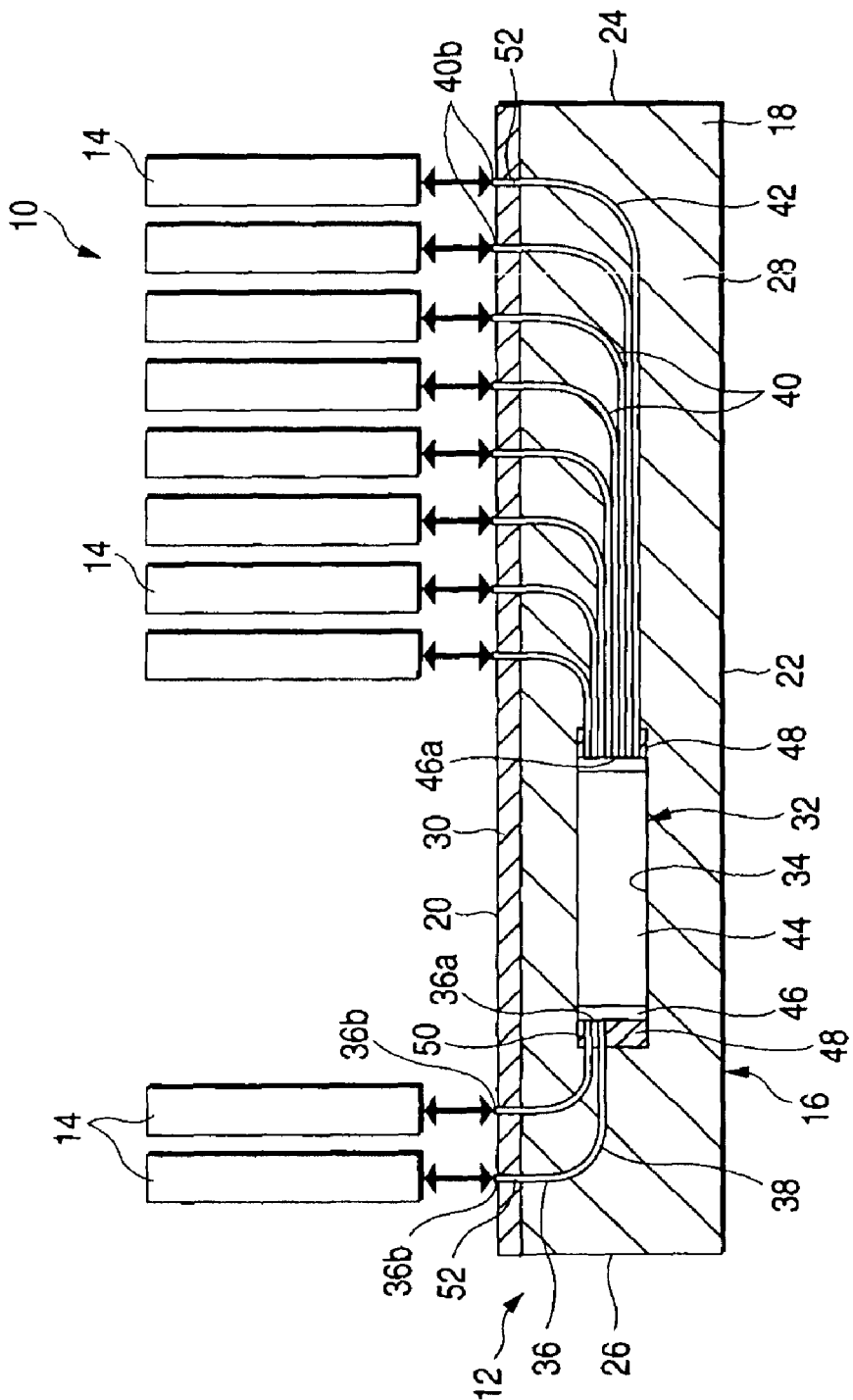
FIG. 1 is a section view of an embodiment according to the invention.
Figure 2:
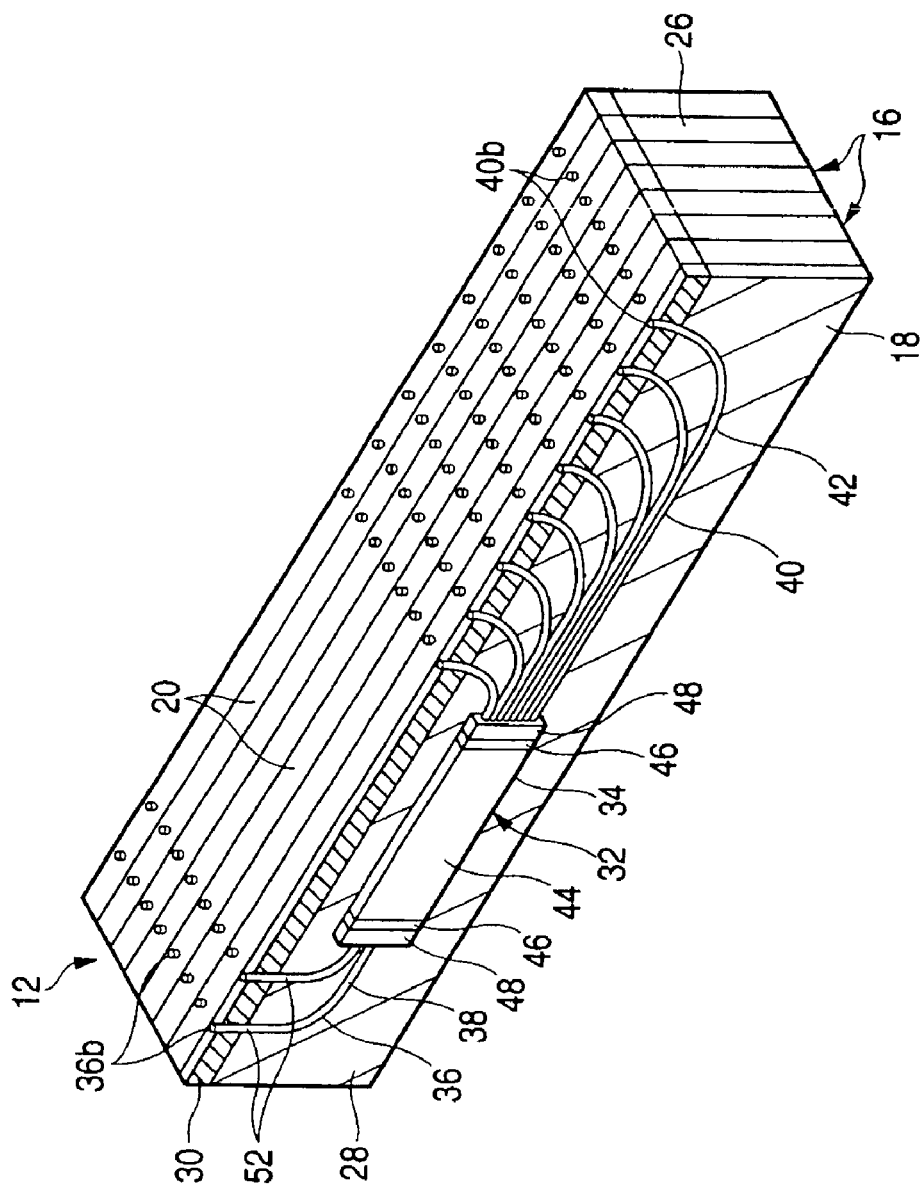
FIG. 2 is a perspective section view of an optical wiring circuits layered body according to the embodiment of the invention.

Now, FIGS. 1 and 2 show a first embodiment according to the invention, in which an opto-electric wiring apparatus 10 comprises an optical wiring circuits layered body 12 and a plurality of electric wiring circuits 14. The optical wiring circuits layered body 12 includes a plurality of sheet-shaped optical wiring circuits 16 (in the present embodiment, 8 optical wiring circuits) and is structured such that the optical wiring circuits 16 are superimposed on one another in a sheet side surface direction. The electric wiring circuits 14 respectively include CPUs and memories as well as are optically connected to the optical wiring circuits 16.

Each of the optical wiring circuits 16 includes an optical wiring circuit board 18 formed in a sheet shape, while the optical wiring circuit board 18 includes two side surfaces as well as an upper surface 20, a lower surface 22, a front surface 24 and a rear surface 26, which connect together the two side surfaces. Also, the optical wiring circuit board 18 has a circuit board main body 28 and a first positioning member 30 connected to an upper surface side of the circuit board main body 28.

The circuit board main body 28 includes, in the interior portion thereof, an planer optical waveguide groove 34 for containing a an planer optical waveguide 32 therein, a first optical wave guide groove 38 for containing therein a first optical wave guide 36 formed of an optical fiber, and a second optical wave guide groove 42 for containing therein a second optical wave guide 40 similarly formed of an optical fiber, while these grooves are formed in correspondence to the shapes and arrangements of their associated optical wave guides. And, the planer optical waveguide 32, first optical wave guide 36 and second optical wave guide 40 are embedded in the circuit board main body 28, or are sandwiched by and between two plates.

The planer optical waveguide 32, similarly to the optical wiring board 18, is formed in a sheet shape; and, the planer optical waveguide 32 has a light guide member 44, two light diffusing members 46, 46 respectively connected to the front and rear surfaces of the light guide member 44, and second positioning members 48, 48 respectively connected to the front and rear surfaces of the light diffusing members 46, 46. Light entering from one light diffusion member 46 is diffused by the light diffusing member 46, is totally reflected by the light guide member 44, is diffused again by the other light diffusing member 46, and is then discharged from the other light diffusing member 46. The light guide member 32 is formed of plastic material such as polymethyl methacrylate, polycarbonate, amorphous polyolefin, or the like or inorganic glass. The light diffusing member 46 may be preferably disposed but the shape of the light guide member 44 is set properly, whereby the light diffusing member 46 can be omitted.

The second positioning member 48 is used to abut one end 36a of the first optical wave guide 36 and one end 40a of the second optical wave guide 40 against proper positions of the light diffusing members 46 and, in the second positioning member 48, there is formed a positioning hole 50. Into the positioning holes 50, there are inserted one end 36a of the first optical wave guide 36 and one end 40a of the second optical wave guide 40, whereby one end 36a of the first optical wave guide 36 and one end 40a of the second optical wave guide 40 are optically connected with the light diffusing member 46. However, in case where it is ensured that one end 36a of the first optical wave guide 36 and one end 40a of the second optical wave guide 40 can be optically connected with the light diffusing member 46 (or the planer optical waveguide 32), the second positioning member 48 can be omitted.

The first optical wave guide 36 extends from one end 36a thereof toward the rear surface 26 of the optical wiring circuit board 18, is bent, and then extends toward the upper surface 20 of the optical wiring circuit board 18. Also, the second optical wave guide 40 extends from one end 40a thereof toward the front surface 24 of the optical wiring circuit board 18, is bent, and then extends toward the upper surface 20 of the optical wiring circuit board 18. And, the other ends 36b, 40b of the first and second optical wave guides 36, 40, which are respectively connected with one-side ends 36a, 40a, for example, face the upper surface 20 of the optical wiring circuit board 18. Here, the term "face" is defined in the following manner: that is, the other ends 36b, 40b of the first and second optical wave guides 36, 40 are present in the vicinity of one surface of the optical wiring circuit board 18 and are situated at positions which allow the other ends 36b, 40b to be optically connected with the electric wiring circuit board 14 (which will be discussed later).

The above-mentioned first positioning member 30 basically has a similar structure to the second positioning member 48 and is used to abut the other end 36b of the first optical wave guide 36 and the other end 40b of the second optical wave guide 40 against the electric wiring circuits 14 properly; and, in the first positioning member 30, there is formed positioning holes 52. Into the positioning hole 52, there are inserted the other end 36b of the first optical wave guide 36 and the other end 40b of the second optical wave guide 40. However, in case where it is ensured that the end 36b of the first optical wave guide 36 and the other end 40b of the second optical wave guide 40 can be optically connected with the electric wiring circuit 14, the first positioning member 30 can be omitted.

In the present embodiment, eight optical wiring circuits 16 are superimposed on one another, while the other end 36b of the first optical wave guide 36 and the other end 40b of the second optical wave guide 40 are respectively disposed so as to form in a line with regularity in the sheet direction of the optical wiring circuit board 18 and in the layered (superimposed) direction of the optical wiring circuits 16. The electric wiring circuit 14 is connected in a direction at right angles to the layered direction of the optical wiring circuits 16 and is arranged so as to be able to transmit and receive an 8-bit light signal to and from the optical wiring circuit layered body 12. there is formed an optical bus.

Figure 3:
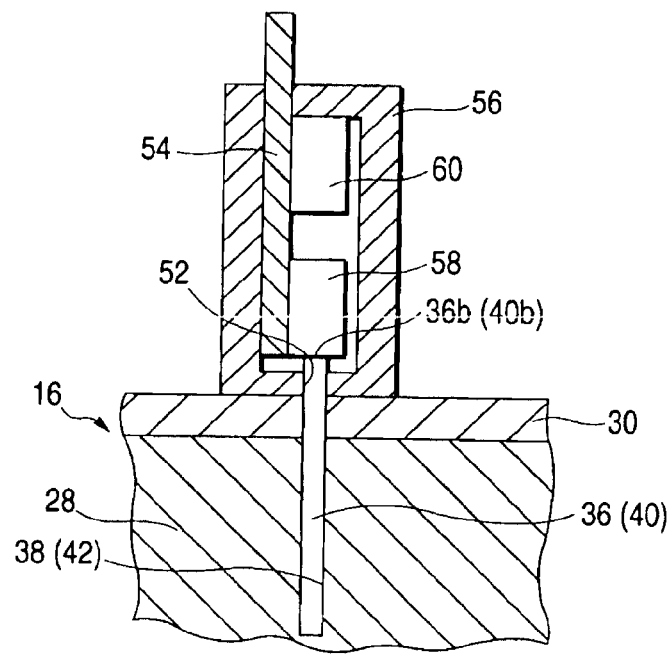
FIG. 3 is a section view of a connecting portion between an optical wiring circuit and an electric wiring circuit according to the embodiment of the invention.

Now, FIG. 3 shows a connection structure for connecting together the above-mentioned electric wiring circuit 14 and the optical wiring circuit 16. The optical wiring circuit 14 includes an electric wiring circuit board 54 and a connector 56 disposed at one end of the electric wiring circuit board 54. On the surface of the electric wiring circuit board 54, there are disposed a photoelectric conversion element 58 and a drive circuit 60 for driving the photoelectric conversion element 58. The photoelectric conversion element 58 is a light receiving element or a light emitting element and, in the present specification, includes both of an element for converting light to electricity and an element for converting electricity to light. And, the photoelectric conversion element 58 is disposed on the lower end of the electric wiring circuit board 54; and, the other end 36b of the first optical wave guide 36 or the other end 40b of the second optical wave guide 40 is abutted against the light receiving surface of the photoelectric conversion element 58 or the light emitting surface thereof, whereby the photoelectric conversion element 58 can be optically connected with the first optical wave guide 36 or the second optical wave guide 40. However, in case where a gap between the first optical wave guide 36 or the second optical wave guide 40 and the photoelectric conversion element 58 is set in such a manner that an optical connection loss is sufficiently small, they are not always be abutted against each other but there may be a gap between the first optical wave guide 36 or the second optical wave guide 40 and the photoelectric conversion element 58.

Figure 4:
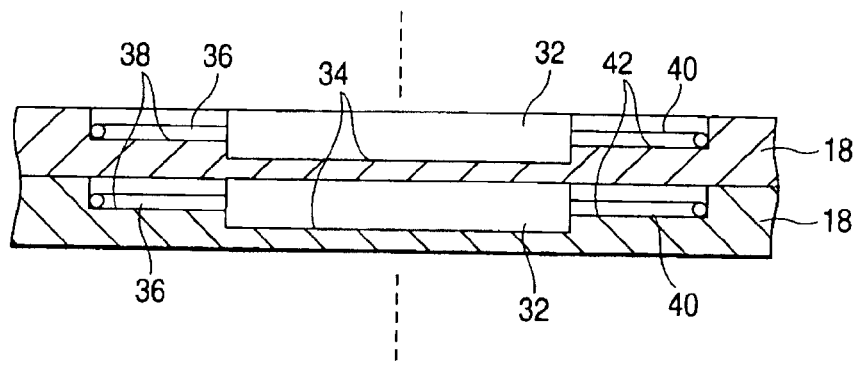
FIG. 4 is a section view of a first modification of an optical wiring circuit board according to the embodiment of the invention.
Figure 5:
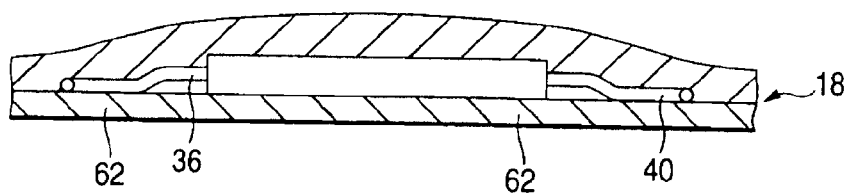
FIG. 5 is a section view of a second modification of an optical wiring circuit board according to the embodiment of the invention.

Now, FIGS. 4 and 5 respectively show modifications of the optical wiring circuit board 18. FIG. 4 shows a first modification of the optical wiring circuit board 18. In the previously-mentioned embodiment, the planer optical waveguide 32 as well as the first and second optical wave guides 36, 40 are embedded in the optical wiring circuit board 18. On the other hand, in the present first modification, the planer optical waveguide groove 34, first light guide groove 38 and second light guide groove 42 are respectively formed in such a manner that they are open to the side surface of the optical wiring circuit board 18; and, in the planer optical waveguide groove 34, first light guide groove 38 and second light guide groove 42, there are disposed the planer optical waveguide 32 as well as the first and second optical wave guides 36, 40. The planer optical waveguide groove 34, first light guide groove 38 and second light guide groove 42 are closed by the side surface of another optical circuit board 18 superimposed on the above optical circuit board 18 to be able to fix the planer optical waveguide 32. Therefore, the structure thereof can be simplified.

FIG. 5 shows a second modification of the optical circuit board 18. According to the second modification, the optical circuit board 18 has a base member 62 and a cover film 64. The planer optical waveguide 32 as well as the first and second optical wave guides 36, 40 are mounted on the surface of the base member 62 and are covered with the cover film 64. In the second modification, there is eliminated the need for provision of grooves, which makes it possible to reduce the manufacturing cost of the optical circuit board 18. By the way, the planer optical waveguide 32 as well as the first and second optical wave guides 36, 40 can also be mounted on both surfaces of the base member 62.

Figure 6:
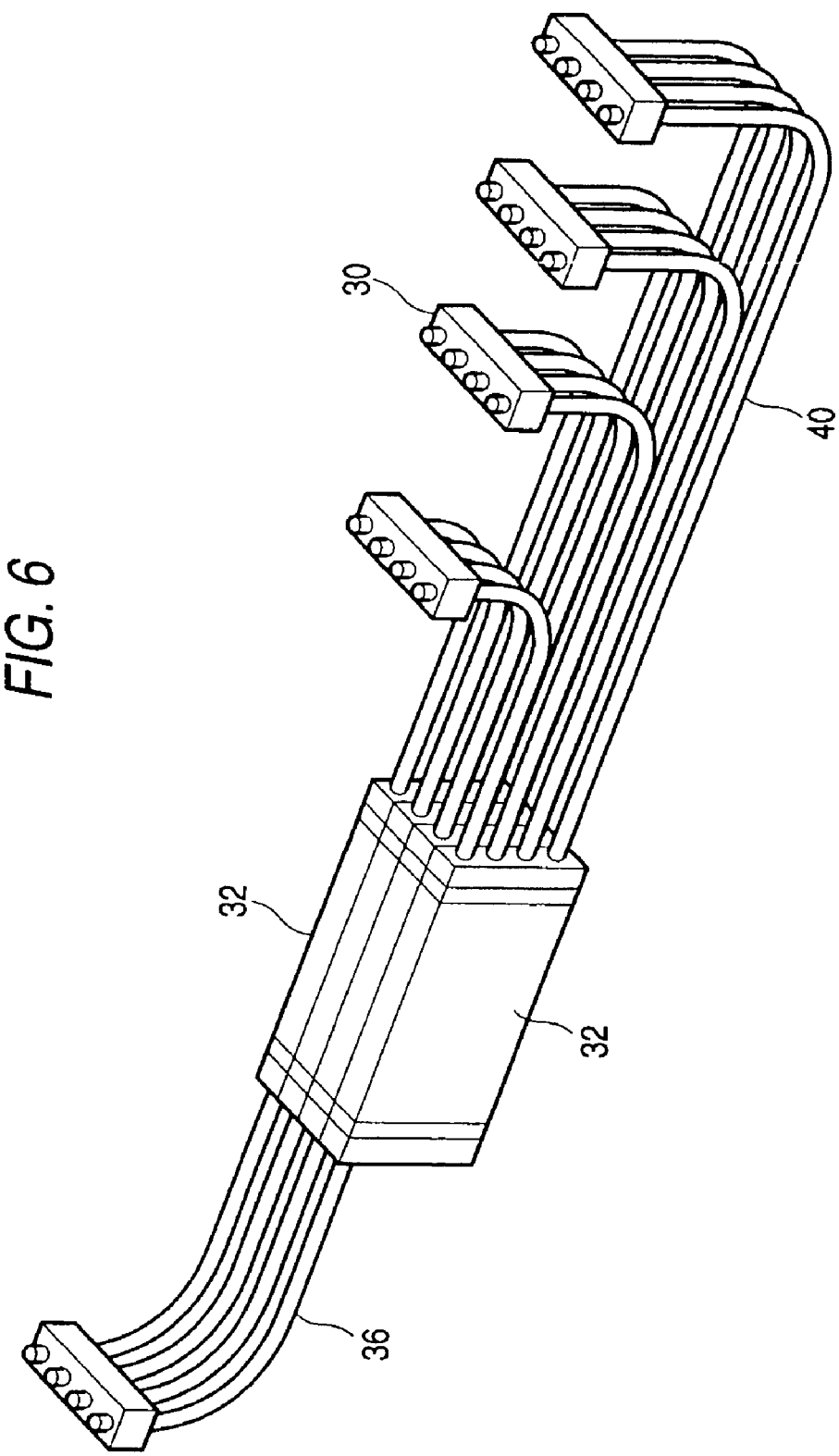
FIG. 6 is a perspective view of a first modification of a first positioning member according to the embodiment of the invention.
Figure 7:
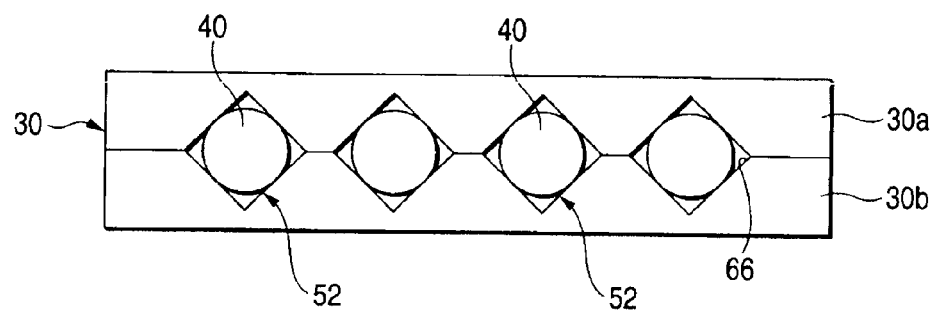
FIG. 7 is a perspective view of a second modification of a first positioning member according to the embodiment of the invention.
Figure 8:
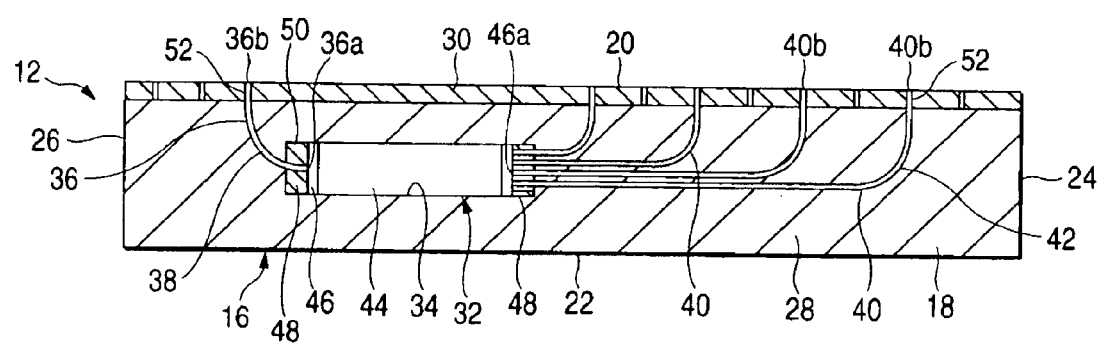
FIG. 8 is a perspective view of a third modification of a first positioning member according to the embodiment of the invention.

Now, FIGS. 6 to 8 respectively show modifications of the first positioning member 30. Specifically, FIG. 6 shows a first modification of the first positioning member 30. In the previously-mentioned embodiment, the first positioning member 30 is disposed in parallel to the circuit board main body 28. On the other hand, according to the first modification, the first positioning member 30 is disposed in a direction at right angles to the circuit board main body 28, that is, in the same direction to the electric wiring circuit 14. In other words, the first positioning member 30 is disposed to be along a base of the electric wiring circuit 14, which is opposed to the first positioning member 30. Therefore, the other end 36b of the first optical wave guide 36 or the other end 40b of the second optical wave guide 40 connected to the planer optical waveguide 32 is fixed to the other end 36b of the first optical wave guide 36 or the other end 40b of the second optical wave guide 40 connected to another planer optical waveguide 32 through the first positioning member 30 so as to face to a surface of surface of the first positioning member 30. That is, each of other ends are fixed in parallel to the electric wiring circuit so that the positioning accuracy can be further enhanced. Also, in the present modification, it is shown that the above-mentioned optical wiring circuit board 18 may be omitted.

Now, FIG. 7 shows a second modification of the first positioning member 30. In the previously-mentioned embodiment, in the first positioning member 30, there is formed positioning holes 52, while the first optical wave guide 36 or second optical wave guide 40 is inserted into this positioning holes 52. On the other hand, in the second modification, in two positioning plates 30a, 30b, there are formed V-shaped positioning grooves 66 and the two positioning plates 30a, 30b are combined together in such a manner that the V-shaped positioning grooves 66 are opposed to each other to form the positioning holes 52. This can also apply to the second positioning member 48 similarly.

Now, FIG. 8 shows a third modification of the first positioning member 30. In the above-mentioned embodiment, the first optical wave guide 36 or second optical wave guide 40 is inserted into all of the positioning holes 52 of the first positioning member 30. On the other hand, in the third modification, the positioning hole 52 of the first positioning member 30 is formed as a standard product; for example, with respect to four second optical wave guides 40, there are formed, for example, eight positioning holes 52 and, of the eight positioning holes 52, four positioning holes 52 are used.

Figure 9:
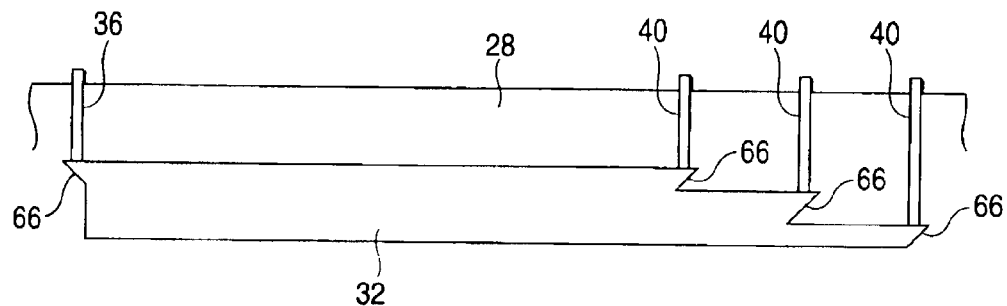
FIG. 9 is a side view of a first modification of an planer optical waveguide according to the embodiment of the invention.

Now, FIGS. 9 to 21 respectively show modifications of the planer optical waveguide 32. Firstly, FIG. 9 shows a first modification of the planer optical waveguide 32. In the previously-mentioned embodiment, the first and second optical wave guides 36, 40 are connected to the front and rear surfaces of the planer optical waveguide 32. On the other hand, in the first embodiment, the first and second optical wave guides 36, 40 are connected to the planer optical waveguide 32 from the upper surface direction thereof. And, in the input/output portion of the planer optical waveguide 32, there are formed reflecting section 66 in such a manner that the end faces thereof are cut at an angle of 45°. The light, which enters from the first and second optical wave guides 36, 40, is reflected by the reflecting section 66 and is discharged from the first and second optical wave guides 36, 40. Therefore, the first and second optical wave guides 36, 40 can be extended from the upper surface portion of the planer optical waveguide 32, which makes it possible to reduce the bent portions of the first and second optical wave guides 36, 40.

Figure 10:
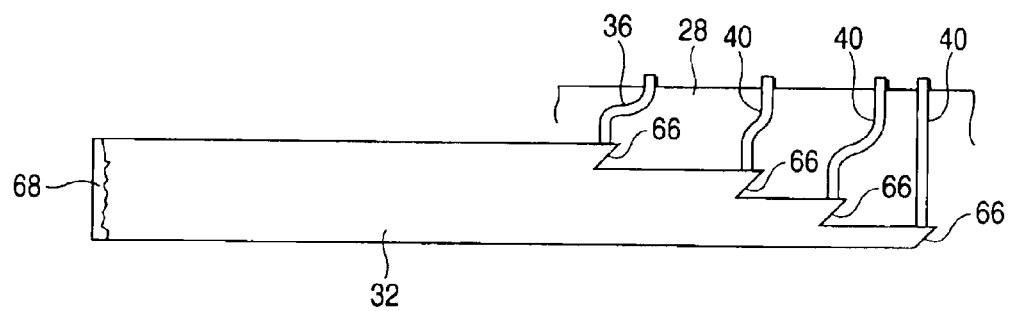
FIG. 10 is a side view of a second modification of an planer optical waveguide according to the embodiment of the invention.

FIG. 10 shows a second modification of the planer optical waveguide 32, in which reflecting and diffusing section 68 is disposed on the end face of the planer optical waveguide 32. In the second modification, the light, which enters from the first and second optical wave guides 36, 40, is reflected and diffused by the reflecting and diffusing section 68, and is discharged from the first and second optical wave guides 36, 40. According to the second modification, the first and second optical wave guides 36, 40 can be disposed near to one side of the planer optical waveguide 32, which can further facilitate the connection of the planer optical waveguide 32.

Figure 11:
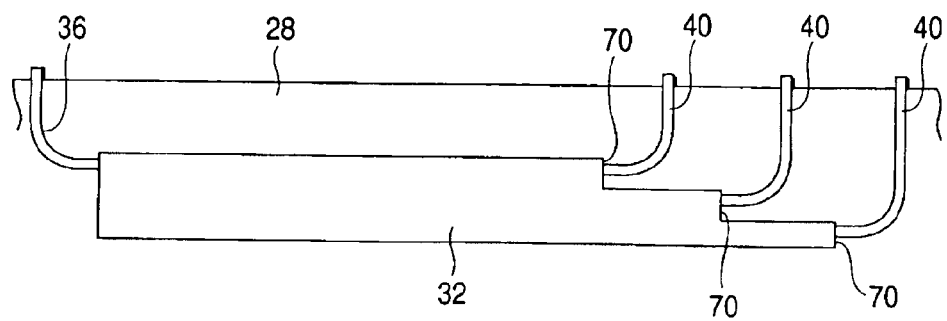
FIG. 11 is a side view of a third modification of an planer optical waveguide according to the embodiment of the invention.

FIG. 11 shows a third modification of the planer optical waveguide 32, in which stepped portions 70 are disposed on the end face of the planer optical waveguide 32. Therefore, the second optical wave guides 40 can be connected to the planer optical waveguide 32 in the stepped portions 70.

Figure 12:
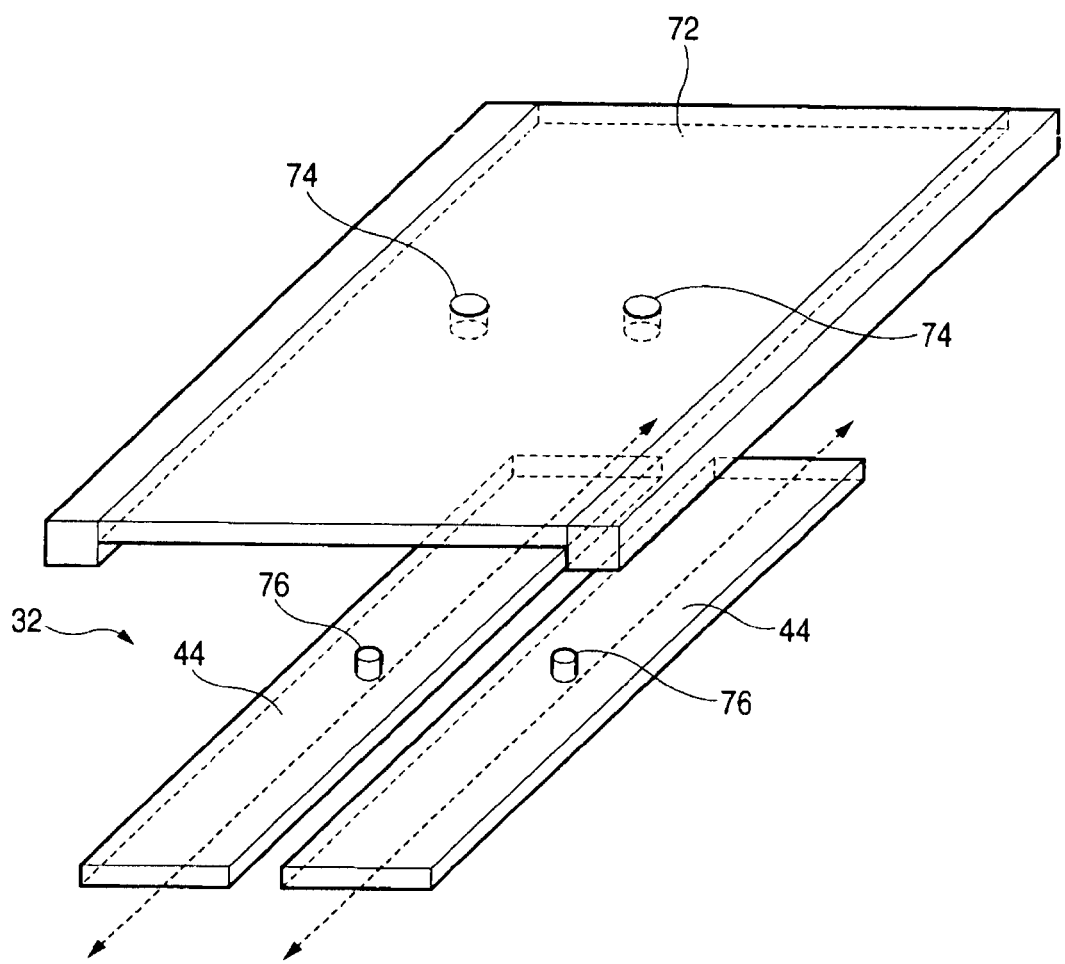
FIG. 12 is a perspective view of a fourth modification of an planer optical waveguide according to the embodiment of the invention.
Figure 13:
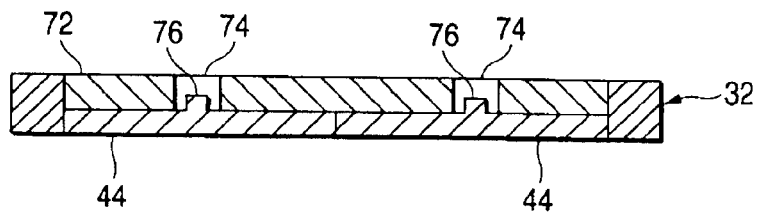
FIG. 13 is a section view of the fourth modification of an planer optical waveguide according to the embodiment of the invention.
Figure 14:
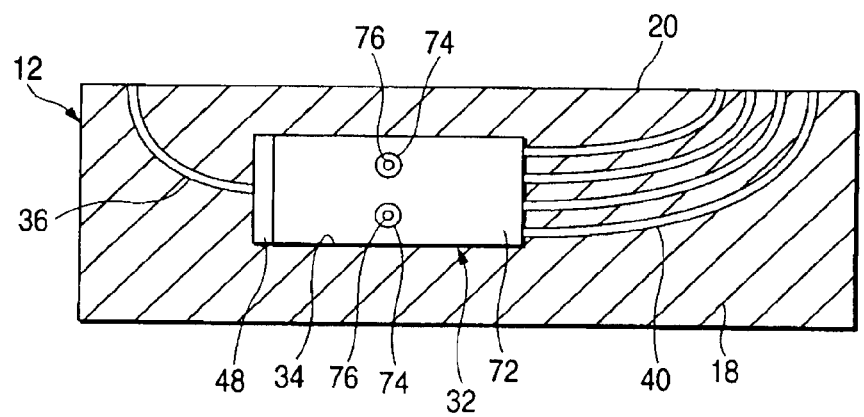
FIG. 14 is a section view of an optical wiring circuit using an planer optical waveguide according to the fourth modification.
Figure 15:
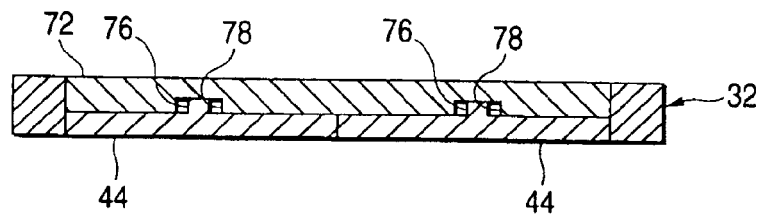
FIG. 15 is a section view of a fifth modification of an planer optical waveguide according to the embodiment of the invention.

FIGS. 12 to 14 show a fourth modification of the planer optical waveguide 32. In the fourth modification, the planer optical waveguide 32 includes a support body 72 and, in this support body 72, there are formed, for example, two relief holes 74. For example, in the side surface portions of the two light guide members 44, there are projectingly provided gate portions 76; and, these gate portions 76 are inserted into the relief holes 74 of the support body 72 respectively. Each of the light guide members 44 is formed of resin by injection molding and the gate portion 76 is a portion which is left when the resin is poured. In case where the gate portion 76 is directly contacted with the optical wiring circuit board 18, there is a fear that the gate portion 76 interferes with the optical wiring circuit board 18 to be floated up, thereby causing an error in the connection position between the light guide member 44 and the first optical wave guide 36 or second optical wave guide 40. The relief holes 74 of the support body 72 are formed so as to avoid such interference. As in a fifth modification of the planer optical waveguide 32 shown in FIG. 15, instead of the relief holes 74, there may also be formed a recess-like relief groove 78. Also, in case where there are formed relief holes 76 or relief groove 78 directly in the optical wiring circuit board 18, the support body 72 can be omitted. By the way, since an optical part normally requires accuracy, injection molding cannot be used; however, as in the present embodiment, because a sheet-shaped light guide member uses the diffusion of light, severe accuracy is not required and thus injection molding can be used.

Figure 16:
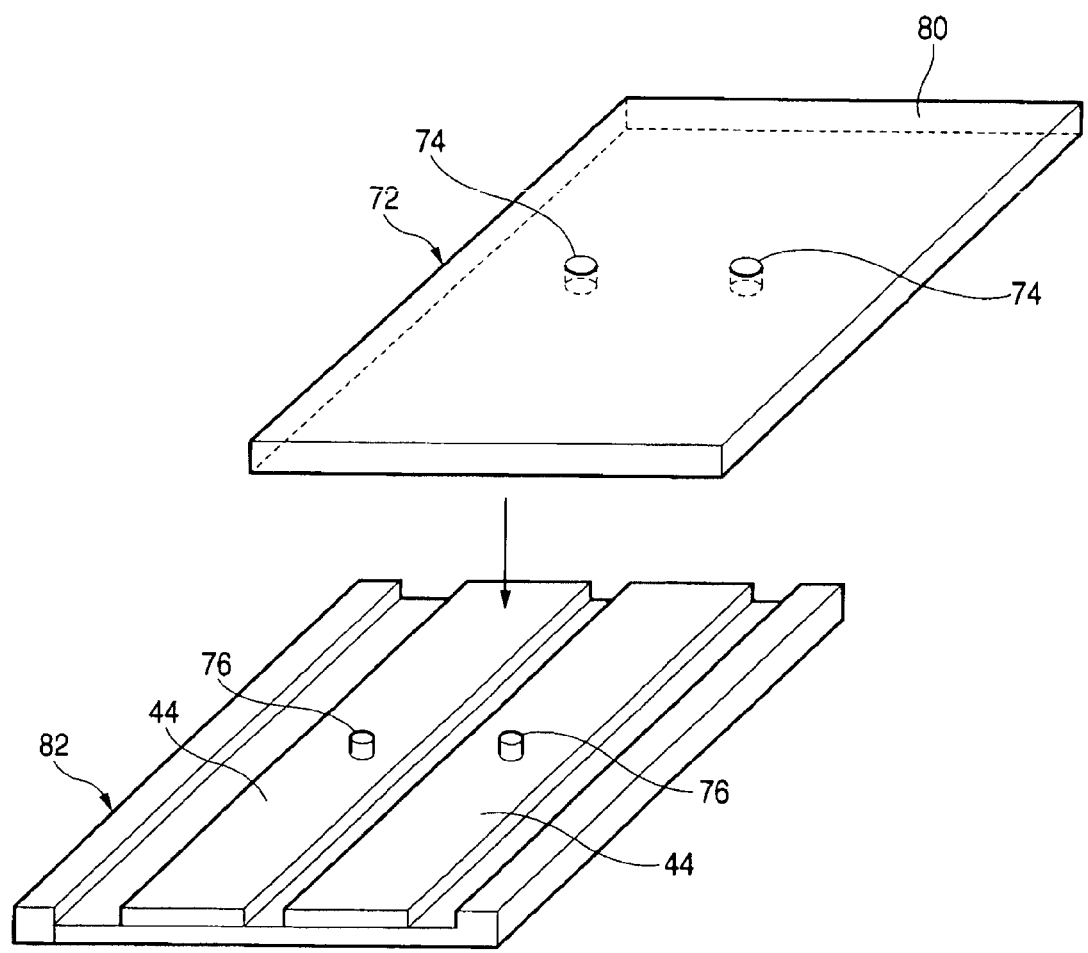
FIG. 16 is a perspective view of a sixth modification of an planer optical waveguide according to the embodiment of the invention.
Figure 17:
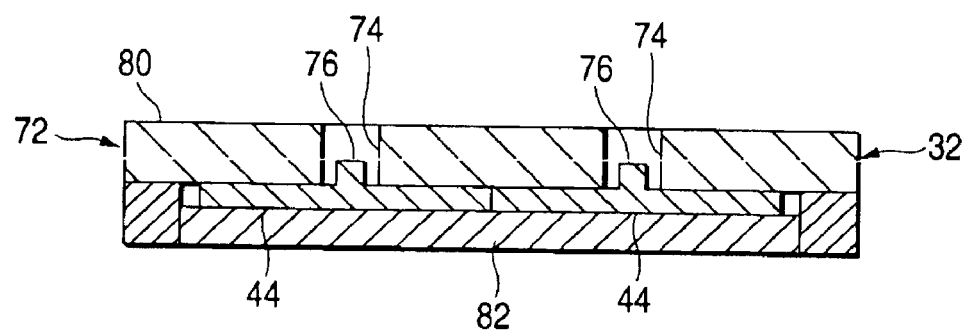
FIG. 17 is a section view of the sixth modification of an planer optical waveguide according to the embodiment of the invention.
Figure 18:
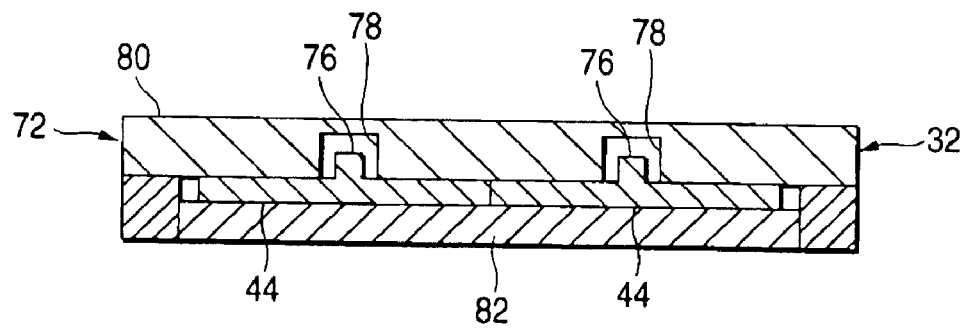
FIG. 18 is a section view of a seventh modification of an planer optical waveguide according to the embodiment of the invention.

Now, FIGS. 16 and 17 show a sixth modification of the planer optical waveguide 32. In the sixth modification, the support body 72 is composed of a first support member 80 and a second support member 82; and, the first support member 80 is fitted with the second support member 82 and, between the first and second support members 80 and 82, there are sandwiched light guide members 44. In the first support member 80, there are formed relief holes 74 and the gate portions 76 of the light guide members 44 are inserted into the relief holes 74 respectively. Similarly to the fourth modification, that is, as in a seventh modification shown in FIG. 18, instead of the relief holes 74, there may be used relief grooves 78 which are formed as recesses.

Figure 19:
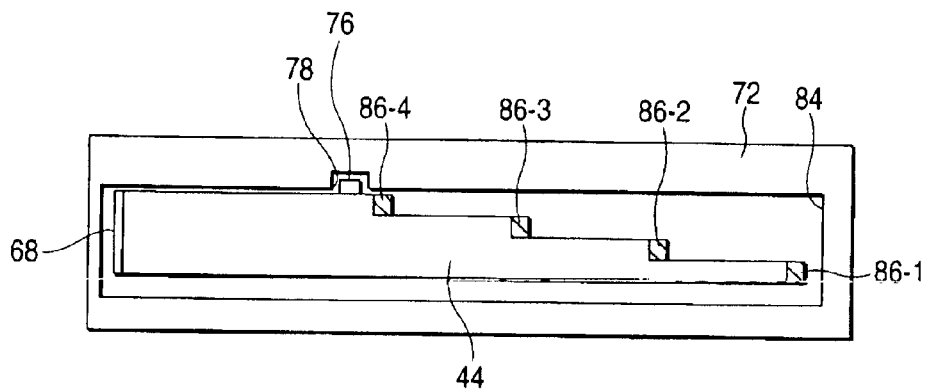
FIG. 19 is a plan view of an eighth modification of an planer optical waveguide according to the embodiment of the invention.
Figure 20:
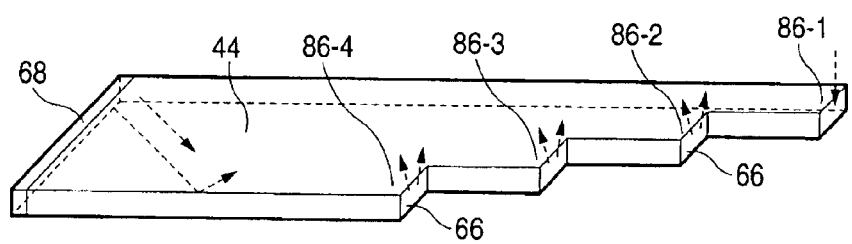
FIG. 20 is a perspective view of the eighth modification of an planer optical waveguide according to the embodiment of the invention.

Now, FIGS. 19 and 20 show an eighth modification of the planer optical waveguide 32. In the eighth modification, each of the light guide members 44 is formed in a step-like manner, and includes, for example, four light input/output portions 86-1 to 86-4 respectively cut at an angle of, for example, 45° so that it can include reflecting section 66; and, on the opposite side end face of the light guide member 44, similarly to the second modification shown in FIG. 10, there is disposed reflecting and diffusing section 68. The light entering from one light input/output portion 86-1 is reflected by the reflecting section 66, is further reflected and diffused by the reflecting and diffusing section 68, and is output from the other remaining light input/output portions 86-2 to 86-4. The present light guide member 44 is fixed to the support body 72 in such a manner that it can be contained in a containing groove 84 formed in the support body 72. In the eighth modification, the gate portion 76 is formed in the upper surface of the light guide member 44 and, in correspondence to the gate portion 76, in the support body 72, there is formed a relief groove 78.

Figure 21:
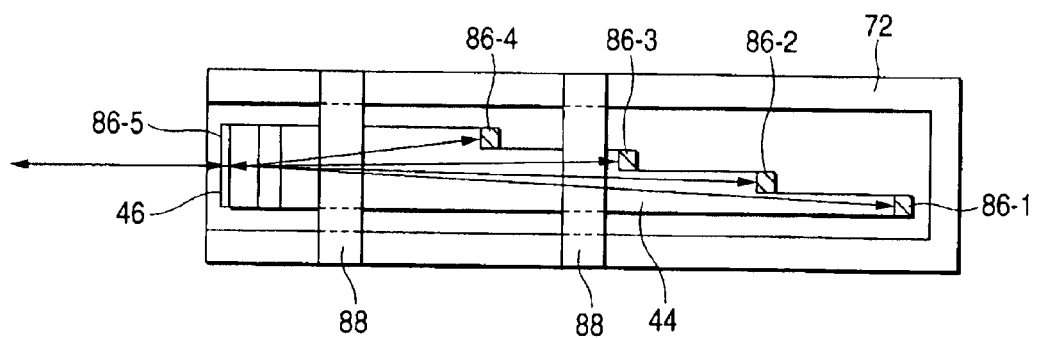
FIG. 21 is a plan view of a ninth modification of an planer optical waveguide according to the embodiment of the invention.

Now, FIG. 21 shows a ninth modification of the planer optical waveguide 32. In the ninth modification, each of the light guide members 44 includes four light input/output portions 86-1 to 86-4 formed similarly to the eighth modification and, on the end face of the light guide member 44, there is disposed a light-transmissive light diffusing member 46; and, on this end face, there is formed a light input/output portions 86-5. The light can be transmitted and received between the light input/output portions 86-5 and the other light input/output portions 86-1 to 86-4. Also, the gate portion 76 is formed on the side surface of the light guide member 44 and, in case where flatness is not specially required on the gate portion 76 side, there can be disposed a fixing member 88 which fixes the light guide member 44 while avoiding the gate portion 76; that is, the light guide member 44 can be fixed to the support body 72 through the fixing member 88.

By the way, in the above-mentioned embodiment, independent optical fibers are used for the first and second optical wave guides 36 and 40. However, there can also be used a bundle fiber composed of optical fibers bundled together, or a ribbon-shaped ribbon fiber.

As has been described heretofore, according to the invention, since the optical wave guides are disposed so as to face one surface of the optical wiring circuit, the connection of the optical wiring circuit with another optical wiring circuit or an electric wiring circuit may be carried out from the present surface side, which can facilitate the connection thereof. Also, superimposition of the optical wiring circuits on one another makes it possible to realize free optical connection between a required number of multiple points to multiple points.

What is claimed is:

1. An optical wiring circuit, comprising:
   a board;
   at least one planer optical waveguide disposed on a principal surface of the board;
   at least one first optical wave guide having a first end optically connected to the planer optical waveguide; and
   at least one second optical wave guide having a second end optically connected to the planer optical waveguide;
   wherein the first optical wave guide is extended toward one side surface of the board, and has a first other end, connected to the first end, being located in a neighboring portion of the side surface;
   the second optical wave guide is extended toward the side surface, and has a second other end, connected to the second end being located in a neighboring portion of the side surface; and
   a light diffusing member for diffusing a light beam is disposed between the planer optical waveguide and one of the first end and/or the second end, the light diffusing member being disposed at least at an end of the planer waveguide.

2. The optical wiring circuit according to claim 1, wherein a principal surface of the planer optical waveguide is disposed in parallel to the principal surface of the board.

3. The optical wiring circuit according to claim 1, wherein each of the first and second optical wave guide comprises an optical fiber.

4. The optical wiring circuit according to claim 3 wherein the board includes grooves on the principal surface and the first and second optical wave guide are disposed in the grooves.

5. The optical wiring circuit according to claim 1, wherein the planer optical waveguide includes steps connected to the first and the second ends.

6. An optical wiring circuit layered body comprising a plurality of optical wiring circuits, each having:
   an planer optical waveguide formed in a sheet-like shape;
   a first optical wave guide having a first end optically connected to the planer optical waveguide; and
   a second optical wave guide having a second end optically connected to the planer optical waveguide
   wherein the first optical wave guide has a first other end connected to the first end;
   the second optical wave guide has a second other end connected to the second end;
   the first other end and the second other end face a side surface;
   the optical wiring circuits are superimposed on one another in a sheet side surface direction; and
   a light diffusing member for diffusing a light beam is disposed between the planer optical waveguide and one of the first end and/or the second end, the light diffusing member being disposed at least at an end of the planer waveguide.

7. The optical wiring circuit layered body according to claim 6, wherein one of the first other end of the first optical wave guide and the second other end of the second optical wave guide connected to one planer optical waveguide is at least fixed to one of the first other end of the first optical wave guide and the second other end of the second optical wave guide connected to other planer optical waveguide.

8. An opto-electric wiring apparatus comprising:
   an optical wiring circuit having:
      at least one planer optical waveguide;
      at least one first optical wave guide having a first end optically connected to the planer optical waveguide; and
      at least one second optical wave guide having a second end optically connected to the planer optical waveguide;
   an electric circuit board; and
   an opto-electric conversion element disposed on the electric circuit board,
   wherein the first optical wave guide has a first other end connected to the first end;
   the second optical wave guide has a second other end connected to the second end;
   the first and second other ends face a side surface;
   the opto-electric conversion element has an electric wiring circuit optically connected to one of the first other end of the first optical wave guide and the second other end of the second optical wave guide; and
   a light diffusing member for diffusing a light beam is disposed between the planer optical waveguide and one of the first end and/or the second end, the light diffusing member being disposed at least at an end of the planer waveguide.

9. The opto-electric wiring apparatus according to claim 8, wherein the optical wiring circuit has a board on which the planer optical waveguide is disposed;
   the planer optical waveguide is formed in a sheet-like shape; and a principal surface of the planer optical waveguide is disposed in parallel to a principal surface of the board.

10. An opto-electric wiring apparatus comprising:

an optical wiring circuit layered body including a plurality of wiring circuits, each having:
- a planer optical waveguide formed in a sheet-like manner;
- a first optical wave guide having a first end optically connected to the planer optical waveguide; and
- a second optical wave guide having a second end optically connected to the planer optical waveguide, a plurality of electric wiring circuits, each having:

an electric circuit board; and an opto-electric conversion element disposed on the electric circuit board, wherein the first optical wave guide has a first other end connected to the first end;

the second optical wave guide has a second other end connected to the second end;

the first and second other ends face a surface;

a light diffusing member for diffusing a light beam is disposed between the planer optical waveguide and one of the first and/or the second end, the light diffusing member being disposed at least at an end of the planer waveguide.

each of the plurality of electric wiring circuits is optically connected to one of the first other end of the first optical wave guide and the second other end of the second optical wave guide, and the plurality of electric wiring circuits are disposed in a vertical direction to a layered direction of the optical wiring circuit layered body.

11. An optical wiring circuit, comprising:

a board;

at least one planer optical wave guide disposed on a principal surface of the board;

at least one first optical wave guide having a first end optically connected to the planer optical wave guide; and at least one second optical wave guide having a second end optically connected to the planer optical wave guide;

wherein the first optical wave guide is extended toward one side surface of the board, and has a first other end, connected to the first end, facing the side surface;

the second optical wave guide is extended toward the side surface, and has a second other end, connected to the second end, facing the side surface; and a light diffusing member for diffusing a light beam is disposed between the planer optical waveguide and one of the first end and/or the second end, the light diffusing member being disposed at least at an end of the planer waveguide.

* * * * *